United States Patent Office 3,403,522
Patented Oct. 1, 1968

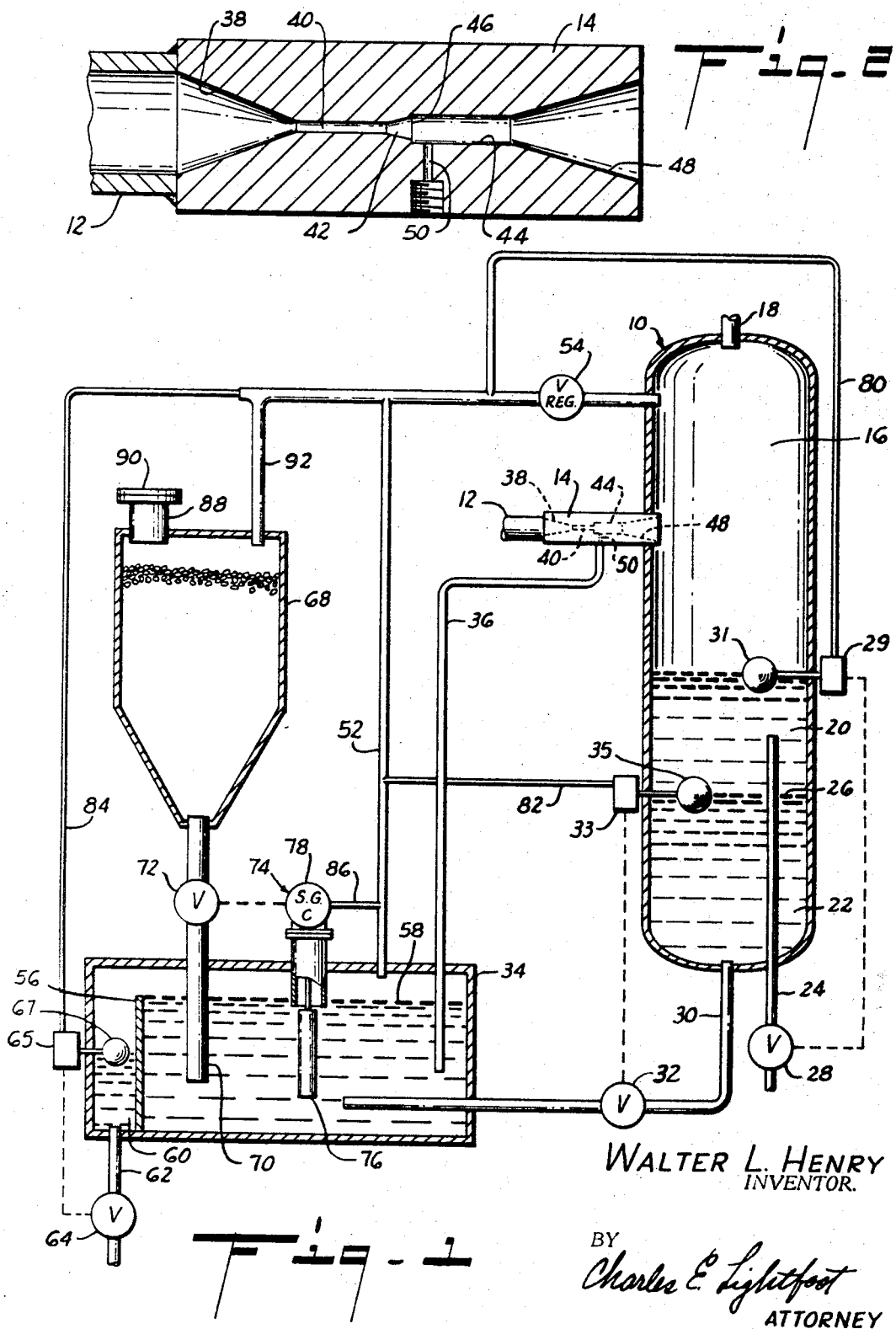

3,403,522
APPARATUS FOR LOW TEMPERATURE
DEHYDRATION OF GASES
Walter L. Henry, 1321 Modiste Drive,
Houston, Tex. 77055
Filed Apr. 26, 1965, Ser. No. 450,654
3 Claims. (Cl. 62—37)

This invention relates to an apparatus for the removal of moisture from gases, and more particularly to the separation of liquid and gas components of the high pressure streams from gas and oil wells.

The invention further relates to an apparatus for the prevention of the formation of the crystalline solids known as gas hydrates which are found in gaseous products containing water, such as natural gas, when the pressure and temperature of such products are reduced during production of the same from wells. It further and particularly relates to an apparatus for removing part of the water vapor from a product such as natural gas at the reduced temperature and pressure condition to which such a product is brought during the production of the same from a well.

The invention also relates to an apparatus for utilizing the energy of a high pressure well stream as a means for injecting into the stream a treating material from a system whose pressure is substantially lower than the pressure to which the well stream is reduced during its flow from the well.

One of the major problems associated with the production and transportation of natural gas and gases produced from gas and oil wells is the formation of gas hydrates. These ice-like crystals block valves and flow-lines, preventing the normal and continuous operation of equipment, with resultant loss of production and revenue. While the exact structural composition of gas hydrates has never been satisfactorily explained, it is known that they are formed by the interaction of water and hydrocarbon gases. Considerable experimental and operational data have been compiled on the pressure-temperature conditions for hydrate formation for a given gas composition, and it is known that these hydrates will form in gas streams in the presence of free water at temperatures considerably above the freezing point of water.

In reducing the pressure of high-pressure natural gas and gases produced from gas and oil wells to transmission line pressures, the resultant temperatures frequently fall below the hydrate formation temperature for the system. It then becomes necessary to either eliminate the hydrates that are formed, or to prevent their formation in the first place. The second alternative is the most common.

The following methods are commonly employed in preventing hydrate formation in products of this kind:

(a) Raising the temperature of the system above the hydrate formation point at the reduced pressure of the system;

(b) Dehydrating the well stream to a dew-point below the minimum temperature that the system will be subject to at the reduced pressure;

(c) Injecting a substance into the high-pressure side of the system capable of lowering the hydrate formation temperature below the minimum temperature that the system will be subject to at the reduced pressure.

Numerous variations of all of the above methods are being used, either severally or in combination. All of these methods have certain disadvantages, either from a safety or operational standpoint. Most of the methods employed for this purpose involve the use of fired heaters, making them unacceptable or extremely expensive in certain applications. Present injection methods involve the use of a mechanically powered pump to inject the hydrate inhibiting substance into the high-pressure system, and these pumps require frequent maintenance and repair. Injection methods using glycols as the hydrate inhibitor require special equipment to remove this material from the reduced pressure system. Injection methods using methanol as the hydrate inhibitor are costly, as this material is usually lost to the system.

The present invention relates to an apparatus for overcoming the disadvantages of previously accepted methods employed for this purpose by injecting a brine solution, capable of lowering the hydrate formation temperature to any required level, into a high-pressure stream from a natural gas or oil well. The term "brine solution" as used herein refers to a salt solution suitable for preventing the formation of gas hydrates in natural gas and the products from gas and oil wells, and includes, but is not limited to, solutions of calcium chloride, lithium chloride, lithium bromide, zinc chloride, barium chloride, sodium chloride, potassium chloride, sodium hydroxide, and mixtures of one or more of these with or without other substances.

One of the objects of this invention is to provide an apparatus for the removal of water from natural gas and the products of gas and oil wells in which a brine solution is injected into the well stream downstream of a flow-control orifice or restriction therein and does not pass through this flow-control device with the well stream.

A further object of the invention is to provide a dehydrating apparatus of the kind mentioned wherein the utilization is made of the energy derived from the velocity of the well stream as it emerges from an orifice or restriction and enters an expansion area to create a low-pressure area downstream of the orifice or restriction, into which the brine solution is drawn.

Another object of the invention is to provide an apparatus of the type referred to which includes separating the injected brine solution from the well stream, discharging this brine into a supply container maintained at a pressure lower than that of the separating container, and reinjecting the brine solution into the well stream.

A further object of the invention is the provision of an apparatus for dehydrating gases, of means for maintaining the density of the brine solution in the supply container at any desired concentration.

The above and other objects and advantages of the invention will be apparent from the following detailed description constituting a specification of the same when considered in conjunction with the annexed drawings, wherein:

FIGURE 1 is a somewhat diagrammatic view of a preferred embodiment of the apparatus of the invention; and FIGURE 2 is a longitudinal, central, cross-sectional view on an enlarged scale of the expansion and injection device by which brine solution is introduced into the gas or similar product in which the formation of hydrates is to be prevented.

Referring now to the drawings in greater detail the invention is disclosed herein in connection with its use for the prevention of the formation of hydrates in gases or fluid products, produced from gas and oil wells, it being understood, however, that the same is capable of application for the dehydration of other products of similar character, from which it may be desired to remove water. The apparatus of the invention includes a three phase separator vessel generally designated 10, of usual construction, into which gas or fluid products may be introduced through an inlet line 12, from an oil or gas well, or other source of such products under relatively high pressure, the pressure of such product being regulated by suitable mechanism, not shown, of the usual type, and the product being introduced into the vessel through an orifice fitting or injector 14, by which a suitable dehydrating material, such as a concentrated brine solution, may be mixed with the product as the same is introduced into the vessel.

The vessel 10 may be of unitary construction, having an upper zone 16, in which gas, separated from liquid components of the product may accumulate and from which such gas may be discharged through an outlet pipe 18, the brine and liquid components being collected in the lower portion of the vessel, wherein the lighter components, such as oil, liquid hydrocarbons, and the like, will be accumulated in a zone 20 above a brine zone 22 located in the bottom portion of the vessel.

An outlet pipe 24 extends upwardly into the vessel, with its upper end located above the oil and water interface, designated 26, and which has a motor valve 28 through which the oil or other lighter components accumulated in the zone 20 may be drawn off, under the control of a control valve 29, of usual construction, which is adapted to be operated by a float 31, located in the vessel above the upper end of the discharge pipe.

A brine discharge pipe 30, opens into the lower end of the vessel 10 and leads to the interior of a brine supply container 34, into which brine may be discharged from the lower end of the vessel through a motor valve 32, under the control of a control valve 33, adapted to be actuated by a float 35, positioned in the vessel 10 below the upper end of the discharge pipe 24.

A brine supply pipe 36 is connected to the brine container 34 with its inlet end located beneath the level of the brine therein and its outlet end connected to and in communication with the interior of the orifice fitting 15, to supply brine to the inflowing product from the pipe 12, as the same flows into the separator vessel. The orifice fitting or injector 14, comprises a generally cylindrical body, having a longitudinal bore therethrough which is connected at one end in communication with the pipe 12, and whose other end opens into the zone 16 of the vessel 10. The bore of the fitting has an inwardly tapering inlet portion 38, whose outer end is of substantially the same diameter as the internal diameter of the pipe 12, and whose inner end terminates in a reduced passageway 40, constituting the orifice or restriction of the fitting. The orifice portion 40 has a somewhat flared end portion 42, which opens into a cylindrical portion 44 to form an annular shoulder 46, facing in the direction of flow of the fluid through the fitting, and which opens into an outwardly flaring portion 48, whose outer end is positioned to discharge into the vessel 10. A side passageway or port 50 opens into the cylindrical bore portion 44 at a location spaced somewhat beyond the annular shoulder 46, and through which brine from the brine container may flow into the bore of the fitting through the brine supply pipe 36 to mix with the inflowing gas or fluid product flowing into the vessel 10 through the orifice fitting. Due to the positioning of the brine inlet port or passageway 50 in the cylindrical bore portion 44, the fluid flowing through the bore of the fitting will cause a reduction in pressure at the location of the port, so that brine will be drawn into the bore through the pipe 36 and commingled with the fluid as the fluid enters the vessel 10.

The brine supply container 34 takes the form of a closed vessel, into which a pressure pipe 52 leads from the zone 16 of the vessel 10, under the control of a suitable pressure regulator 54, to maintain the pressure in the container at a constant value. The brine container has an internal wall 56, whose upper end is spaced below the top of the container, to form therein a brine compartment 58 and a discharge compartment 60 into which brine may flow from the compartment 58 when the brine reaches a predetermined level, and from which excess brine may flow out through a discharge pipe 62, having a motor valve 64, which is operated under the control of a control valve 65, actuated by a float 67, positioned in the compartment 60, below the upper end of the wall 56.

For the purpose of maintaining the brine in the brine container substantially at a predetermined concentration, a chemical supply container 68 is provided, having an outlet pipe 70 extending into the brine container, and whose lower end opens into the brine compartment 58, and through which additional brine forming material may be introduced into the container through a motor valve 72. The motor valve 72 is opened and closed under the control of a specific gravity controller, generally designated 74 which in the present instance has a displacement type float 76 positioned in the brine in the container and which functions to open a control valve 78, upon downward movement of the fluid and to close the same upon upward movement of the float.

Pressure fluid for the actuation of the motor valves 28, 32, 64 and 72 is supplied through branch pipes 80, 82, 84 and 86, respectively, from the pressure supply pipe 52, under the control of the respective control valves 29, 33, 65 and 78.

The supply of brine forming chemical in the container 68 may be replaced through an opening 88, which is provided with a sealed closure 90, and the chemical container is also provided with a pressure pipe 92 through which fluid under pressure may enter the container from the pressure pipe 52 to equalize the pressure in the chemical container with that in the brine container, so that the chemical may flow freely through the pipe 70 into brine container when the value 72 is opened.

It will be understood that the material in the container 68 may be in the form of suitably granulated solids, or may take the form of a suitably highly concentrated liquid, by which concentration of the brine in the brine container may be maintained.

During the operation of the equipment, constructed and arranged as described above, fluid from the high pressure source enters the orifice fitting, which acts as a flow control device, from the inlet line 12, and after passing through the orifice or restriction 40, enters the bore portion 44, which constitutes a primary expansion zone into which the brine inlet port 50 opens. The port 50 is thus located in a zone of reduced pressure created by the velocity of the fluid passing through the primary expansion zone into the main expansion zone 16 of the vessel 10, to cause an inflow of brine from the container 34 through pipe 36 into the fitting, whereby the brine is commingled with the fluid. By suitably proportioning the size of the primary expansion zone 44 to that of the restriction 40 and suitably locating the inlet port 50 in the primary expansion zone, a reduction in pressure in the primary expansion zone at the port may be produced to cause an inflow of brine into the fitting. The flared portion 48 of the bore of the fitting provides a diffusion zone which serves to avoid the development of back-pressure in the expansion zone 44, while the internal shoulder 46 serves to direct the fluid past the port 50, thereby reducing any tendency of the fluid to enter the port. The flared portion 42 of the restriction 40, is for the purpose of preventing eddying of the fluid in the expansion zone, such as might be caused by the abrupt change in diameter between the restriction and the cylindrical portion 44.

As the fluid commingled with the brine flows into the main expansion zone 16 of the vessel 10, the velocity and pressure of the stream will be appreciably reduced, causing a lowering of the temperature of the fluid which results in condensation of part of the water vapor and hydrocarbon vapor, which combine with the brine and liquid hydrocarbons in the fluid and accumulate in the lower portion of the vessel. In addition to the water vapor removed from the gaseous fluid by condensation, the brine solution injected into the stream has a lower vapor pressure than the water vapor in the gas at the temperature and pressure existing in the main expansion zone 16, and as a result the brine absorbs water vapor from the gaseous portion of the fluid until an equilibrium is reached between the vapor pressure of the brine and that of the remaining gas. The degree of dehydration of the gas will be a function of the chemical composition and concentration of the brine, as well as the temperature of the system, but is independent of the pressure in the vessel.

When the level of the accumulated brine in the vessel rises to the point that the float 35 is moved upwardly, the control valve 33 will be opened to supply gas under pressure from the pressure pipe 52 to motor valve 32 to open the same, whereupon brine will be returned to the container 34 from the vessel until the valve 32 is again closed. Similarly, when the liquid hydrocarbons have accumulated above the brine to the extent to move the float 31 upwardly, control valve 29 will be operated to supply pressure to motor valve 28 to allow the outflow of such hydrocarbons through the pipe 24.

In the event that the amount of water removed by the brine is sufficient to cause the returned brine from the vessel to overflow the internal wall 56 of the container 34, the overflow will rise in the compartment 60 until the float 67 is moved upwardly to operate control valve 65 to supply pressure to motor valve 64 to open the same, whereupon the excess liquid will be discharged through pipe 62.

The removal of water from the fluid stream by the brine will result in dilution of the brine solution, which in turn will dilute the supply of brine in the container 34 to an extent that the float 76 will move downwardly to operate the control valve 78 to supply pressure to the valve 72 to open the same to permit the flow of replenishing material from the container 68 into the brine container to reconcentrate the brine. When the concentration of the brine has been thus increased to an extent to move the float 76 upwardly the valve 72 will again be closed as a result, to shut off further flow of replenishing chemical into the brine receptacle.

By suitably regulating the pressure supplies to the brine receptacle 34 through the pressure pipe 52, brine will be delivered to the fitting 14 to be injected into the entering stream of fluid, even when the pressure in the vessel 10 is somewhat higher than the pressure supplied to the brine receptacle.

The method of the invention comprises the prevention of the formation of solid hydrates in a stream of fluid containing hydrocarbons and water in proportions to form such hydrates upon lowering of the pressure of the stream to cause a reduction in temperature sufficient to cause such formation, which comprises mixing a concentrated brine with the stream to absorb water therefrom, allowing the mixture to expand to reduce the temperature thereof to cause condensation of water and hydrocarbons from the vaporous or gaseous components of the mixture, recovering the brine from the mixture, and maintaining the brine at a predetermined concentration. The method also comprises the recycling of the brine while maintaining the concentration of the same at a predetermined value, and contemplates the delivering of brine to the injector under pressure whereby the reduction in pressure in the injector required to commingle the brine with the fluid under treatment may be greatly reduced.

The separation of the liquid and gas components of the fluid under treatment and the removal of the water and accumulation of the brine need not, of course, be accomplished in a single vessel, as herein described, but may be carried out in a number of vessels properly arranged and connected by suitable piping for the purpose, as will be understood by persons skilled in the art to which the invention pertains.

It will also be apparent that other equivalent means may be employed for the drawing-off, dumping and replenishing operations instead of the float actuated control valves and motor valve means disclosed herein.

It will thus be seen that the invention provides a method of and apparatus for preventing the formation of solid hydrates in fluids, such as those produced from high pressure oil and gas wells, when the pressure of such fluids is reduced by expansion to an extent to cause a reduction in temperature which would ordinarily result in the formation of such hydrates.

The invention is disclosed herein in connection with a certain specific embodiment of the apparatus thereof and particular steps of the method called for, which it will be understood are intended to be illustrative only, the apparatus, as well as the steps of the method being capable of various modifications within the spirit of the invention and the scope of the appended claims.

Having thus clearly shown and described the invention, what is claimed as new and desired by Letters Patent, is:

1. In apparatus for removing water from a fluid containing water and hydrocarbons in proportions to form crystalline hydrates of such hydrocarbons upon reduction of the temperature of the fluid by expansion of the same to the temperature at which such hydrates may form, means forming a zone of higher pressure and a zone of lower pressure into which such fluid may flow from the zone of higher pressure to expand the fluid and reduce the temperature thereof, means forming an expansion zone through which fluid may flow from said zone of higher pressure to said zone of lower pressure means for introducing a brine into the fluid in said expansion zone to form a mixture of fluid and brine in which water from the fluid is absorbed in the brine, a vessel into which said mixture may flow from said zone of lower pressure to allow the brine to separate from the mixture, means for removing from the vessel brine separated from the mixture and chemical means for reconcentrating the brine so removed to a predetermined concentration.

2. In apparatus for removing water from a fluid containing water and hydrocarbons in proportions to form crystalline hydrates of such hydrocarbons upon reduction of the temperature of the fluid by expansion of the same to the temperature at which such hydrates may form, an expansion vessel, fluid flow control means through which such fluid may flow from a source of such fluid at a higher pressure into the vessel at a lower pressure to expand the fluid and reduce the temperature thereof, a brine receptacle, means for introducing brine from said receptacle into the fluid during such expansion to form a mixture of fluid and brine in the vessel in which water from the fluid is absorbed in the brine, and means for allowing an outflow from the vessel into said receptacle of brine separated from said mixture, and means for allowing an outflow of brine from said receptacle when the level of brine in the receptacle rises above a predetermined level.

3. The apparatus as claimed in claim 2 including means for increasing the concentration of the brine in said receptacle.

References Cited

UNITED STATES PATENTS

| 2,522,648 | 9/1950 | Ruhemann | 62—20 |
| 2,765,045 | 10/1965 | Meyers | 55—174 |
| 3,105,855 | 10/1963 | Meyers | 55—57 |
| 3,122,325 | 2/1964 | Mahrt et al. | 239—318 |

FOREIGN PATENTS

| 307,600 | 3/1929 | Great Britain. |

REUBEN FRIEDMAN, *Primary Examiner.*

C. N. HART, *Assistant Examiner.*